United States Patent
Kaimasu et al.

(10) Patent No.: US 10,052,702 B2
(45) Date of Patent: Aug. 21, 2018

(54) METHOD OF FORMING FRACTURE START PORTION OF CONNECTING ROD AND FORMING DEVICE

(71) Applicant: YASUNAGA CORPORATION, Iga-shi (JP)

(72) Inventors: Yuji Kaimasu, Iga (JP); Jungo Matsui, Iga (JP)

(73) Assignee: Yasunaga Corporation, Mie (JP)

( * ) Notice: Subject to any disclaimer, the term of this patent is extended or adjusted under 35 U.S.C. 154(b) by 375 days.

(21) Appl. No.: 14/784,695

(22) PCT Filed: May 9, 2014

(86) PCT No.: PCT/JP2014/062460
§ 371 (c)(1),
(2) Date: Oct. 15, 2015

(87) PCT Pub. No.: WO2014/185348
PCT Pub. Date: Nov. 20, 2014

(65) Prior Publication Data
US 2016/0074949 A1    Mar. 17, 2016

(30) Foreign Application Priority Data

May 14, 2013   (JP) .................................. 2013-102065

(51) Int. Cl.
*B23D 31/00*     (2006.01)
*B23P 15/00*     (2006.01)
(Continued)

(52) U.S. Cl.
CPC ............. *B23D 31/002* (2013.01); *B23D 3/02* (2013.01); *B23D 13/00* (2013.01); *B23P 15/00* (2013.01);
(Continued)

(58) Field of Classification Search
CPC .... B23P 2700/04; B23P 15/00; B23D 31/002; B23D 13/00; B23D 3/02; B23D 2031/005; B26D 3/06; B26D 3/14; Y10T 29/49288; Y10T 29/49789; Y10T 29/4979; Y10T 29/49792; Y10T 29/49794;
(Continued)

(56) References Cited

U.S. PATENT DOCUMENTS 5,208,979 A   5/1993  Schmidt
5,882,438 A   3/1999  Luchner et al.
(Continued)

FOREIGN PATENT DOCUMENTS

JP       H09-201641 A    8/1997

*Primary Examiner* — Sarang Afzali
(74) *Attorney, Agent, or Firm* — Morgan, Lewis & Bockius LLP (57) ABSTRACT

A method of forming a fracture start portion of a con rod for forming fracture start portions of a con rod at opposing positions in an inner peripheral surface of a large end of the con rod made of metal, includes a first step of forming a groove portion at a position corresponding to the fracture start portion by using a first insert tip with a large tip end and a second step of forming the fracture start portion, which has become a V-shaped groove, by machining a bottom portion of the groove portion smaller by using a second insert tip having a tip end smaller than the first insert tip.

3 Claims, 7 Drawing Sheets

(51) Int. Cl.
 *B23D 3/02* (2006.01)
 *B23D 13/00* (2006.01)
 *B26D 3/14* (2006.01)

(52) U.S. Cl.
 CPC .... *B23D 2031/005* (2013.01); *B23P 2700/04* (2013.01); *B26D 3/14* (2013.01); *Y10T 29/4979* (2015.01); *Y10T 29/49288* (2015.01); *Y10T 29/49789* (2015.01); *Y10T 29/49792* (2015.01); *Y10T 29/49794* (2015.01); *Y10T 29/49796* (2015.01); *Y10T 74/2142* (2015.01); *Y10T 83/0304* (2015.04)

(58) Field of Classification Search
 CPC ........... Y10T 29/49796; Y10T 74/2142; Y10T 74/2162; Y10T 83/0304
 See application file for complete search history.

(56) References Cited

U.S. PATENT DOCUMENTS

| | | | | |
|---|---|---|---|---|
| 6,571,999 B2* | 6/2003 | Hase | .................... | B23D 31/003 225/1 |
| 7,159,559 B2* | 1/2007 | Iwasaki | .................. | F16C 7/023 123/197.3 |
| 7,299,716 B2* | 11/2007 | Nakajima | ............... | F16C 7/023 384/294 |
| 7,418,886 B2* | 9/2008 | Kubota | .................. | F16C 7/023 74/593 |

* cited by examiner

METHOD OF FORMING FRACTURE START PORTION OF CONNECTING ROD AND FORMING DEVICE

TECHNICAL FIELD

The present invention relates to a method of forming a fracture start portion of a connecting rod (hereinafter referred to simply as a "con rod") of an automobile, for example, and a forming device.

BACKGROUND ART

On an inner peripheral surface of a large end such as a con rod of an automobile, for example, a technology of forming a fracture start portion composed of recessed portions in a groove state or linearly continuing at slight intervals at positions opposing each other in a thickness direction has been known (see Patent Literature 1 and Patent Literature 2, for example).

When such a fracture start portion is to be formed, in Patent Literature 1 and Patent Literature 2, a laser device is used. In order to form an accurate fracture start portion by the laser device, a considerably expensive device at a price of several tens of millions yen needs to be introduced and installed. Thus, instead of this laser device, an exclusive broaching machine is used for forming a fracture start portion having a V-shaped groove in some cases (see Patent Literature 3, for example).

CITATION LIST

Patent Literature

[Patent Literature 1] U.S. Pat. No. 5,208,979
[Patent Literature 2] U.S. Pat. No. 5,882,438
[Patent Literature 3] Japanese Patent Laid-Open No. H09-201641

SUMMARY OF INVENTION

Technical Problem

In the method of forming a groove portion for fracture of a con rod described in Patent Literature 1 and Patent Literature 2 as described above, since a so-called groove portion for fracture is formed by irradiating a laser beam in a fine pulse to the inner peripheral surface of the con rod large end, an influence of heat generated at a (specific) irradiation position of the laser beam is excessively transmitted to a position adjacent to the groove portion, and there is a concern that fusion more than necessary is generated also at a portion adjacent to the groove portion by this extra heat.

Moreover, even though the groove portion having a predetermined width should have been formed cleanly by such a phenomenon, there is also a concern that the groove portion is formed with an uneven groove width.

Thus, if such a groove not having a desired shape is formed as a con rod fracture start portion, a clean con rod fracture surface cannot be obtained in some cases when a tensile stress is made to act on con rod both ends.

Moreover, for the laser device described in Patent Literature 1 or Patent Literature 2, a YAG laser device is used in general. When the con rod fracture start portion is formed by using the YAG laser device, not only that the device itself is expensive as described above but also a flash lamp exciting the laser beam needs to be replaced regularly in general, which causes a high running cost. Moreover, once the YAG laser device fails, that cannot be dealt with by an ordinary service and maintenance staff, and thus, there is a concern that a line is stopped for a long time with the laser failure. Such a line stop for a long time induces the line stop in the subsequent process and results in a line stop of the entire manufacturing line, and a production plan would go drastically wrong.

On the other hand, if the con rod fracture start portion having the V-shaped groove is to be formed by broaching machining, the following problems occur. Specifically, if the con rod fracture start portion forms a groove shape, unlike a key groove with a large groove width in general, the width of a groove opening is small and deep, and a groove sectional shape is an extremely narrow and special V-shaped groove.

Thus, if the con rod fracture start portion is to be formed by a broaching blade, since R of a groove bottom portion of the V-shaped groove becomes larger as the broaching blade is worn by long-term use, there is a concern that a uniform fracture surface cannot be obtained if the con rod large end is expanded by a mandrel. Moreover, if the V-shaped groove is machined by using the worn broaching blade, a tensile force at the fracture of the con rod becomes larger, power of a con rod fracturing device is required in accordance with that, which contradicts a request for energy-saving. However, since the broaching blade itself is expensive, if the broaching blade is frequently replaced in order to avoid such nonconformity, a production cost would rise and production efficiency lowers.

Moreover, in order to utilize a merit of the V-shaped groove machining using a multi-stage blade constituting the broaching blade, a height of each blade needs to be strictly controlled, which deteriorates maintenance performances. Particularly if a worker not familiar with the work performs maintenance, work hours for maintenance could become more than necessary, which extremely deteriorates production efficiency of the con rod. Moreover, the broaching machine itself provided with the broaching blade is also expensive, which deteriorates cost performances.

Figure 7:
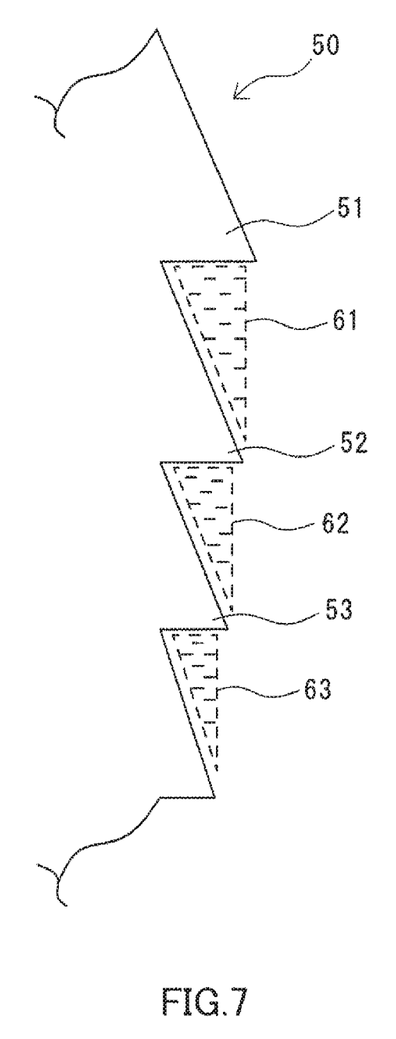
FIG. 7 is a view for explaining nonconformity when the fracture start portion of the con rod is formed by using a broaching blade.

Moreover, in forming the V-shaped groove of the con rod fracture start portion, since two to three blades constituting the broaching blade are in contact with the groove forming portion of the con rod at the same time, chips can easily remain between the blades. FIG. 7 is a view for explaining nonconformity when the con rod fracture start portion is formed by using the broaching blade. As is known from FIG. 7, when the V-shaped groove of the con rod fracture start portion is formed by using a broaching blade 50, discharge performances of all the chips 61, 62, 63, . . . remaining between each of blades 51, 52, 53, . . . constituting the broaching blade 50 need to be considered, which makes an increase of a machining speed difficult and lowers production efficiency. As means for improving the discharge performances, there can be a method of increasing a pitch of each of the blades 51, 52, 53, . . . constituting the broaching blade 50, but with this method, the entire broaching blade 50 becomes long, and even though the machining speed can be raised, a machining stroke is also needed for that portion, and the problem of lowering of production efficiency cannot be solved.

The present invention has an object to provide a method and a fracture start portion forming device of a con rod with can solve all the problems generated when the laser device is used and when the broaching blade is used as above, respectively, and can obtain a stable fracture surface after fracturing with a low cost and high efficiency.

Solution to Problems

In order to solve the aforementioned problems, a method of forming a fracture start portion of a con rod according to claim 1 of the present invention is a method of forming a fracture start portion of a con rod for forming fracture start portions of a con rod at opposing positions in an inner peripheral surface of a large end of the con rod made of metal, including:

a first step of forming a groove portion at a position corresponding to the fracture start portion by using a first insert tip with a large tip end R; and a second step of forming the fracture start portion which has become a V-shaped groove by machining a bottom portion R of the groove portion smaller using a second insert tip having a tip end R smaller than the first insert tip.

Moreover, a fracture start portion forming device of a con rod according to claim 2 of the present invention is a fracture start portion forming device for forming fracture start portions of the con rod at opposing positions in the inner peripheral surface of the large end of the con rod made of metal, wherein after a groove portion is formed at a position corresponding to the fracture start portion by using the first insert tip having a large tip end R, the fracture start portion is formed which has become a V-shaped groove by machining the bottom portion R of the groove portion smaller by using the second insert tip having a tip end R smaller than the first insert tip.

According to the method of forming a fracture start portion of a con rod according to claim 1 of the present invention and the fracture start portion forming device of a con rod according to claim 2, the problems occurring when the fracture start portion of the con rod is formed by using the laser device can be solved. Specifically, a high running cost caused by regular replacement of the flash lamp for exciting laser is no longer needed. Moreover, line stop for a long time caused by the fact that the service and maintenance staff cannot handle the failure of the laser device is not induced. As a result, fracture products can be produced in accordance with a production plan determined in advance.

Moreover, the problem when the fracture start portion of the con rod made of the simple groove portion is formed in the con rod made of a forging material can be solved. Specifically, occurrence of a dimple generated when the con rod made by forging with a fracture start portion made only of a simple groove portion formed is fractured can be prevented. As a result, when the fracture surfaces of the con rods after the fracture are joined again, a region where a stress is locally high is not generated, but an end product with a stable quality can be obtained.

Moreover, the problem when the groove portion of the fracture start portion of the con rod is formed by broaching machining can be solved. Specifically, in the case of fracture after the groove portion is formed by using a worn broaching blade, occurrence of nonconformity against a request for energy-saving caused by power of the con rod fracturing device required in accordance with that can be avoided.

Moreover, the V-shaped groove of the fracture start portion of the con rod has a small and deep groove opening unlike a general key groove as described above. That is, when the V-shaped groove is formed by using the broaching blade, a specific machining condition is required that a V-shape angle should be made small and the bottom portion R of the V-shaped groove should be made as small as possible so that the depth of the V-shaped groove is large and the V-shape has a sharp angle. Due to such strict machining conditions, when the V-shaped groove of the fracture start portion of the con rod is to be formed, when two to three blades constituting the broaching blade are brought into contact with a groove forming portion of the con rod at the same time, chips can easily remain between the blades, and discharge performances of all the chips remaining between the blades need to be considered, which makes an increase of the machining speed difficult and lowers the production efficiency. However, in the case of the present invention, such nonconformity does not occur.

Moreover, according to the method of manufacturing a con rod according to claim 3 of the present invention, it has a first process of preparing a con rod in which the fracture start portion is not formed, a second process of forming the fracture start portion by applying the fracture start portion forming method of the con rod described in claim 1 at opposing positions in the inner peripheral surface of the large end of the con rod, and a third process of fracturing the con rod by expanding the inner peripheral surface in which the fracture start portion of the large end of the con rod is formed by using a mandrel.

Advantageous Effect of Invention

According to the present invention, the method and the device for forming the fracture start portion of a con rod which can solve all the problems occurring when the laser device is used or when the broaching blade is used, respectively, at once and obtain a stable fracture surface after the fracture at a low cost can be provided.

BRIEF DESCRIPTION OF THE DRAWINGS

FIG. 1 are perspective views of a large end of a con rod for explaining a method of forming a fracture start portion of a con rod according to an embodiment of the present invention and they are a view illustrating a state in which groove portion machining at a first step is finished (FIG. 1(a)) and a view illustrating a state in which V-shaped groove machining at a second step is finished (FIG. 1(b)).

FIG. 3 illustrate a fracture start portion forming device of a con rod according to the embodiment of the present invention (FIG. 3(a) and FIG. 3(b)), that is, an explanatory view (FIG. 3(a)) relating to the groove portion machining method of the first step when the method of forming a fracture start portion of a con rod is performed and an explanatory view (FIG. 3(b)) relating to the V-shaped groove machining method of the second step 2.

FIG. 4 are a perspective view (FIG. 4(a)) illustrating an insert tip and its tip holder used for the groove portion machining of the first step illustrated in FIG. 3(a) in a partially enlarged manner and a perspective view (FIG. 4(b)) of an insert tip and its tip holder used for the V-shaped groove machining method of the second step in a partially enlarged manner.

DESCRIPTION OF EMBODIMENT

A method of forming a fracture start portion of a con rod according to an embodiment of the present invention will be described below by referring to the attached drawings. The method of forming a fracture start portion of a con rod according to the embodiment of the present invention is a method of forming fracture start portions at positions opposing each other in a thickness direction in an inner peripheral surface of a large end of the con rod of an automobile made of a forging material.

Figures 1A, 1B:
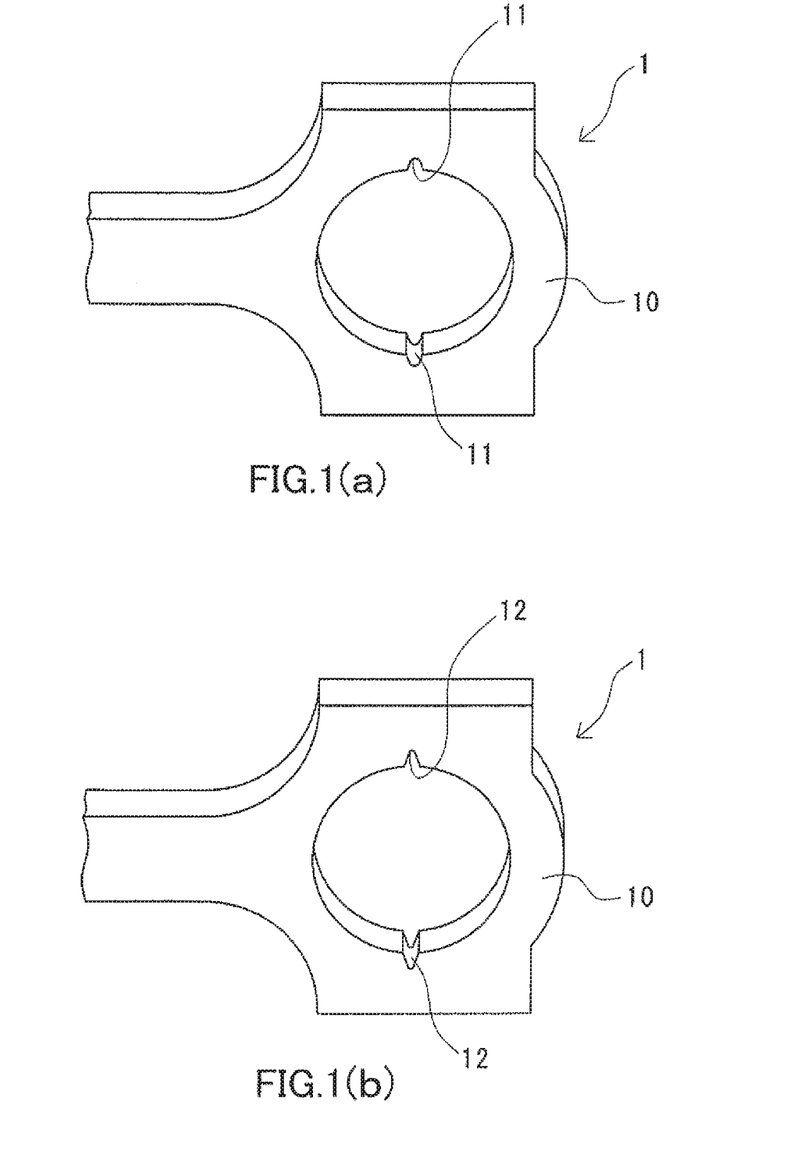
Figure 2A:
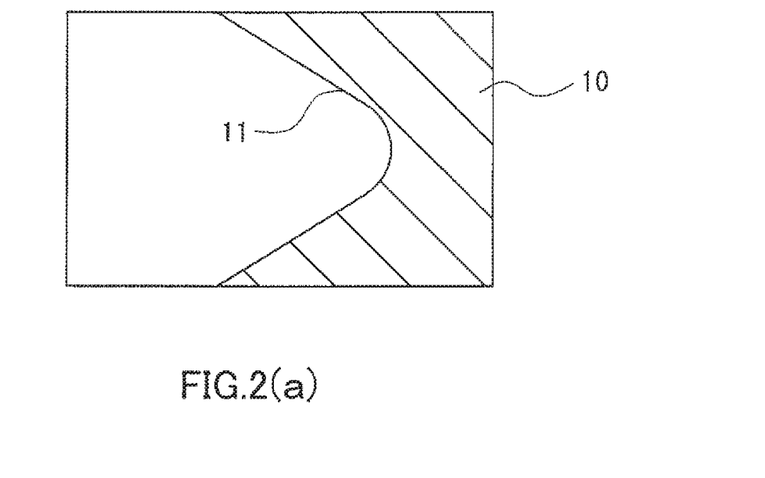
FIG. 2 are partially enlarged sectional views illustrating the groove portion and the V-shaped groove of the con rod illustrated in FIG. 1(a) and FIG. 1(b).
Figure 2B:
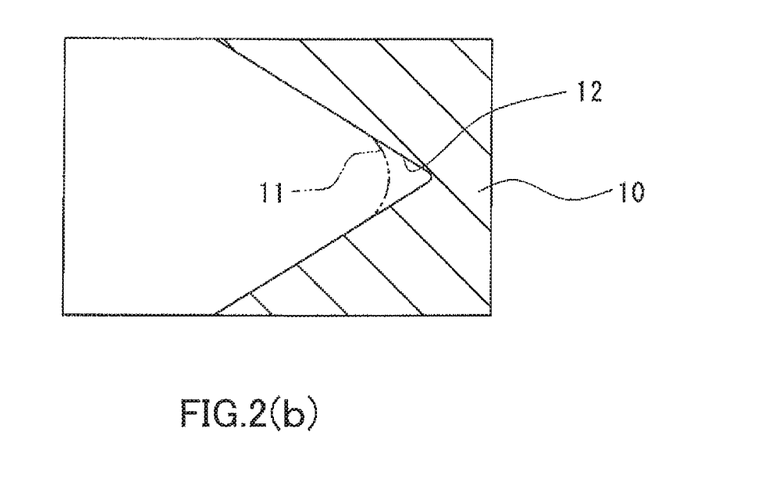

FIG. 1 are perspective views of a large end of the con rod for explaining a method of forming a fracture start portion of a con rod according to the embodiment of the present invention and they are a view illustrating a state in which groove portion machining at a first step is finished (FIG. 1(a)) and a view illustrating a state in which V-shaped groove machining at a second step is finished (FIG. 1(b)). FIG. 2 are partially enlarged sectional views illustrating the groove portion and the V-shaped groove of the con rod illustrated in FIG. 1(a) and FIG. 1(b).

The method of forming a fracture start portion of a con rod 1 according to this embodiment is a method of forming fracture start portions of the con rod at opposing positions in an inner peripheral surface of the large end of the con rod made of forging metal and has the first step for forming the groove portion at positions corresponding to the fracture start portions by using a first insert tip having a large tip end R and a second step for forming the fracture start portion which has become the V-shaped groove by machining a bottom portion R of the groove portion smaller by using a second insert tip having a tip end R smaller than the first insert tip.

As a more specific procedure, first, a machining device for forming a fracture start portion of a con rod provided with machining tool of an insert tip, that is, a machining device corresponding to the broaching machine in Patent Literature 3 is set to the large end of the con rod which is a target to be worked. In this embodiment, an insert tip (the first insert tip as a cutting blade tool) having R=0.1 mm is mounted on this machining device, first. After that, in this embodiment, at positions opposing each other in an inner peripheral surface of the con rod large end, groove portion 11 each having a groove bottom portion of R=0.1 mm are formed by using the aforementioned insert tip having R=0.1 mm as the first step.

Subsequently, the second insert tip as a groove finishing blade with a tip end R smaller than the first insert tip, that is, an insert tip having R=0.03 mm is mounted on the aforementioned machining device in this embodiment as the second step, and by further cutting a portion on the bottom of the groove portion with R=0.1 mm formed in the first step by using this insert tip, a fracture start portion made of a V-shaped groove 12 having the groove bottom portion of R=0.03 mm is formed.

Figure 3A:
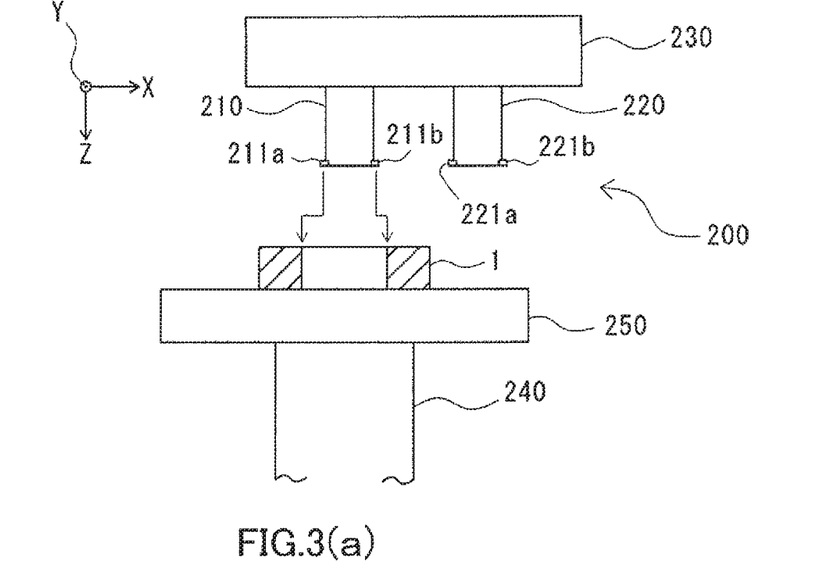
Figure 3B:
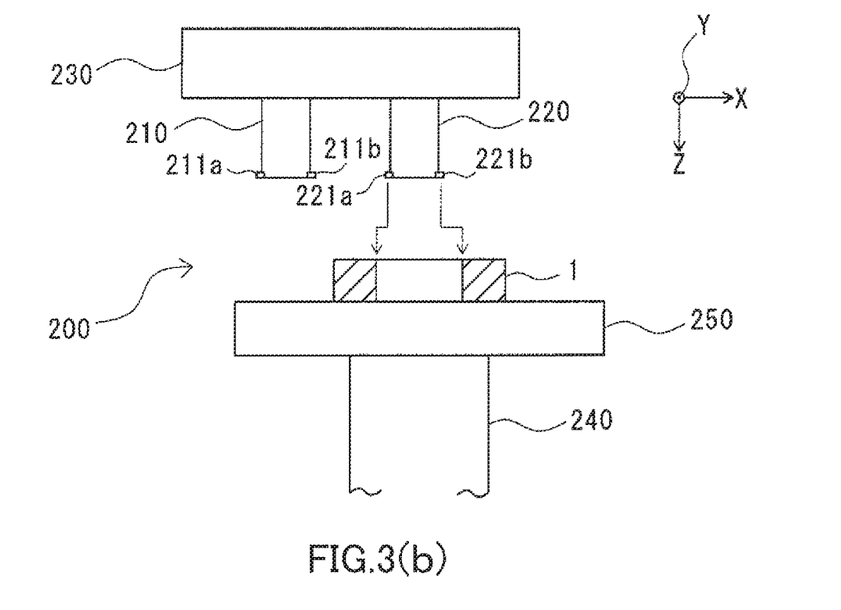

Subsequently, a fracture start portion forming device for executing the aforementioned method of forming a fracture start portion of a con rod will be described. FIG. 3 illustrate the fracture start portion forming device of a con rod according to the embodiment of the present invention (FIG. 3(a) and FIG. 3(b)), that is, an explanatory view (FIG. 3(a)) relating to a groove portion machining method of the first step when the method of forming a fracture start portion of a con rod is performed and an explanatory view (FIG. 3(b)) relating to the V-shaped groove machining method of the second step. Moreover, FIG. 4 are a perspective view (FIG. 4(a)) illustrating an insert tip and its tip holder used for the groove portion machining of the first step illustrated in FIG. 3(a) in a partially enlarged manner and a perspective view (FIG. 4(b)) of an insert tip and its tip holder used for the V-shaped groove machining method of the second step in a partially enlarged manner.

The fracture start portion forming device 200 of a con rod has an insert tip holder support unit 230 movable three-dimensionally by an XYZ-axes orthogonal coordinate-type robot, for example, and inset-tip holders 210 and 220 mounted in a state protruding in parallel at predetermined integrals downward from a lower surface of the insert-tip holder support unit 230. At positions opposing in a diameter direction of a peripheral surface close to a tip end of a lower end portion of one insert-tip holder 210 on the left of the figure, first insert tips 211a and 211b as cutting blades for forming groove portion 11 (see FIG. 1) in an inner peripheral surface of a large end of the con rod are provided at positions opposing in a holder diameter direction, respectively, and second insert tips 221a and 221b as groove finishing blades for forming V-shaped grooves 12 (see FIG. 1) as lower-end fracture start portions in the con rod inner peripheral surface are provided, respectively, at positions opposing in the diameter direction of a peripheral surface close to a tip end of a lower end of the insert-tip holder 220 on the right side in the figure (see FIG. 4).

Moreover, the con rod 1 is constituted to be firmly fixed to an upper surface of a work receiving table 250 supported by a work support portion 240 by a con-rod fixing mechanism (fixing jig), not shown in detail here.

Figure 4A:
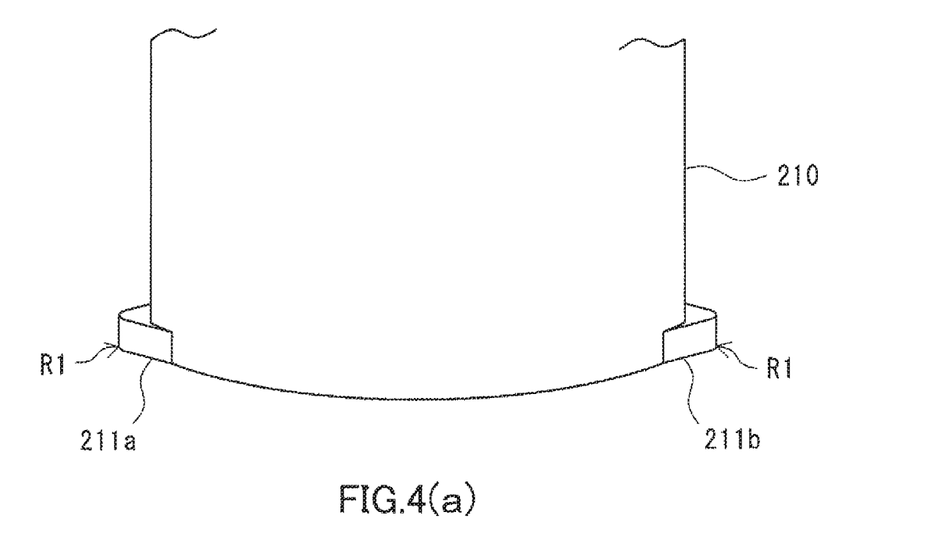
Figure 4B:
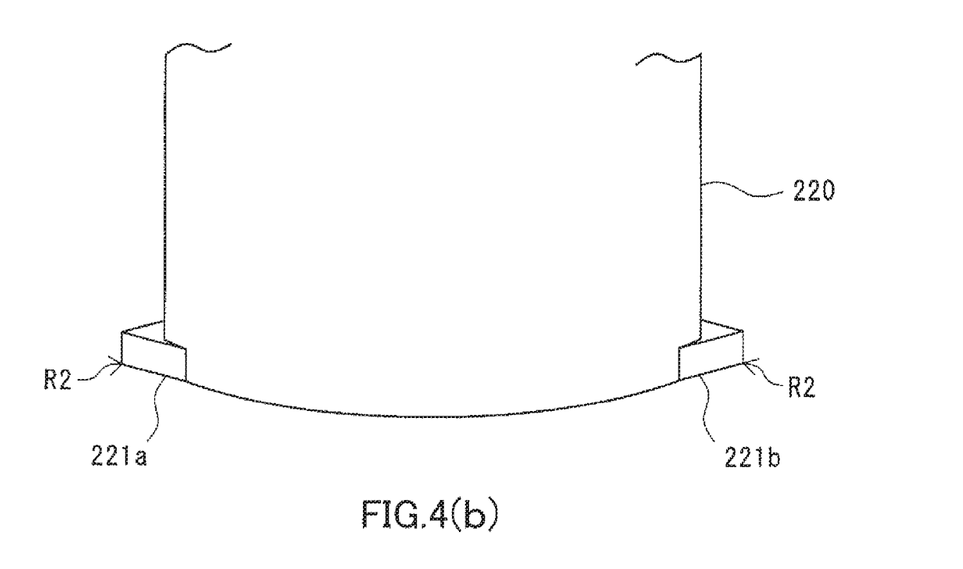

In the present invention, a relation between a radius R1 (see FIG. 4(a)) of a tip end of a machining portion of each of the first insert tips (cutting tips) 211a and 211b used for the aforementioned groove machining and a radius R2 (see FIG. 4(b)) of a tip end of a V-shaped groove machining portion of each of the second insert tips (groove finishing tips) 221a and 221b for forming the V-shaped grooves as the fracture start portions is R1>R2. The radiuses R1 and R2, here, are radiuses around a virtual center axis of each tip in parallel with each of holder center axes and correspond to so-called roundness of the tip ends. Moreover, in this embodiment, R1=0.1 mm and R2=0.03 mm are specified, but it is needless to say that the dimension is not limiting as long as the relation between R1 and R2 is satisfied.

Subsequently, a specific procedure of the method of forming a fracture start portion using the aforementioned fracture start portion forming device 200 of the con rod will be described on the basis of the relation with this device. The specific procedure merely illustrates an example, and it is needless to say that many other procedures can be considered as long as an operation of the present invention can be exerted.

First, a procedure for forming a fracture start portion of the con rod is taught to a controller of the XYZ-axes orthogonal coordinate-type robot (not shown, here), for example, connected to the insert-tip holder support unit shown in FIG. 3(a). Then, a work for forming the fracture start portion of the con rod is started.

At this time, the insert-tip holder support unit 230 is moved on an XY plane by the robot to a position as illustrated in FIG. 3(a). Then, as illustrated by an arrow on the left side above the con rod in FIG. 3(a), the insert-tip holder 210 for forming the groove portion and the first insert tip 211a on the left side provided close to the lower end thereof are moved in the XY direction through the robot to a position corresponding to the fracture start portion of the con rod 1 and also moved in the Z-axis direction in correspondence with the fracture start portion of the con rod, and the inner peripheral surface on the left side of the large end of the con rod 1 in FIG. 3(a) is machined by the first insert tip 211a so as to form the groove portion 11 (see FIG. 1). Then, the robot is driven and the insert-tip holder support unit 230 is returned again to the previous position, the first insert tip 211b provided on the right side of the insert-tip holder 210 for forming the groove portion is moved as shown by an arrow on the right side above the con rod in FIG. 3(a), and machining is performed at a position opposing the aforementioned groove portion 11 and corresponding to the fracture start portion by the first insert tip 211b on the right side in FIG. 3(a) so as to form the groove 11 again by machining similarly to the above.

Subsequently, a work for forming the V-shaped groove 12 (see FIG. 1) as the fracture start portion of the con rod is started. At this time, the insert-tip holder support unit 230 is moved on the XY plane by the robot to a position as illustrated in FIG. 3(b), the second insert tip 221a provided on the left side of the insert-tip holder 220 for forming the fracture start portion is moved in the XY direction through the robot to the position on the left side of the con rod inner peripheral surface and corresponding to the previously formed groove portion as illustrated by an arrow on the left side above the con rod in FIG. 3(b) and is also moved in the Z-axis direction so as to correspond to this groove portion of the con rod 1 so as to machine and form the V-shaped groove as the fracture start portion in the inner peripheral surface on the left side of the large end of the con rod in FIG. 3(b) by the second insert tip 221a. Then, the insert-tip holder support unit 230 is returned to the previous position again, the second insert tip 221b provided on the right side of the insert-tip holder 220 for forming the V-shaped groove as the fracture start portion is moved as illustrated by an arrow on the right side above the con rod in FIG. 3(b), and the V-shaped groove as the fracture start portion is machined and formed at a position opposing the V-shaped groove as the fracture start portion previously formed by the second insert tip 221b in the inner peripheral surface of the large end of the con rod 1 similarly to the above and corresponding to the groove portion before the V-shaped groove is formed.

By using the fracture start portion forming device 200 of the con rod according to this embodiment as mentioned before, machining can be performed without using the broaching blade having a large number of blades as before, and thus, a machining speed of the V-shaped groove in which a width of the groove opening is small and a depth thereof is large and which is a shape specific to the con rod fracture start portion forming device can be improved, and the con rod fracture start portion can be formed efficiently without performing an excess work such as removing chips remaining between each blade of the broaching blade.

Subsequently, a variation of the fracture start portion forming device 200 of the con rod according to this embodiment illustrated in FIG. 4 will be described. This variation is different from the aforementioned embodiment in a point that positions of the insert tip holder and the insert tip provided therein are different, while the other constitution is the same, and thus, only the differences will be described.

Figure 5:
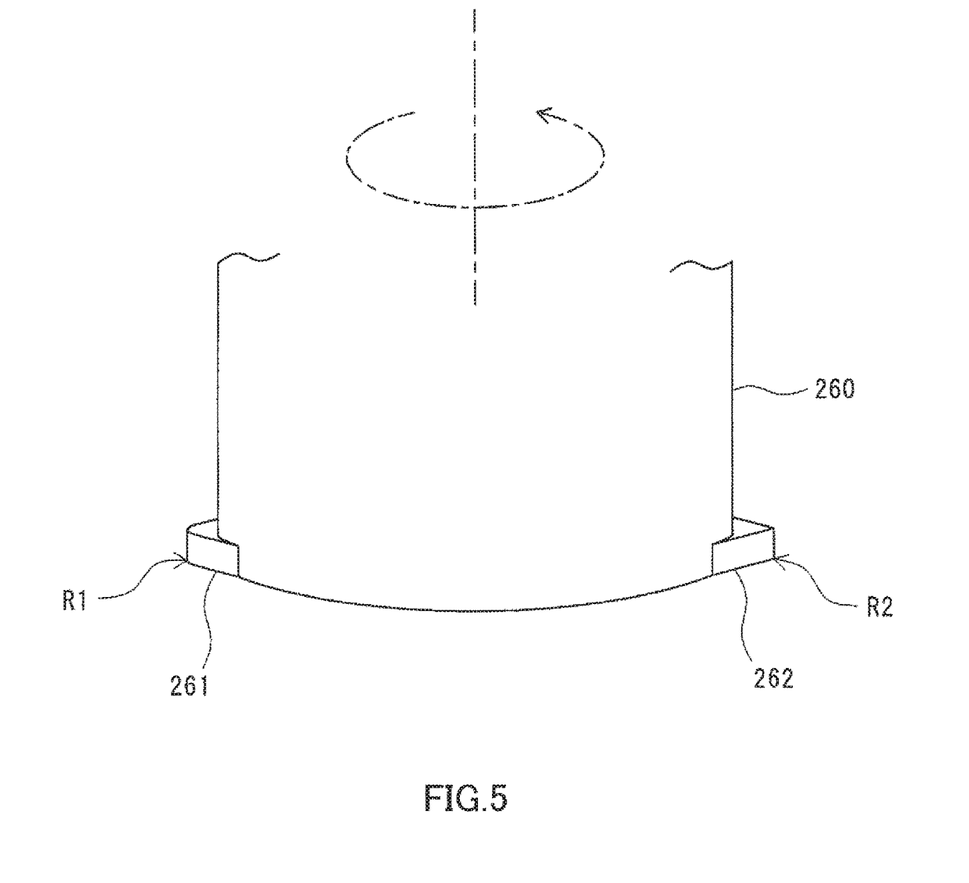
FIG. 5 is a view illustrating a variation of the insert tip and the tip holder of the device of forming a fracture start portion of a con rod illustrated in FIG. 4 in an enlarged manner.

FIG. 5 is a view illustrating the variation of a portion of the insert tip and the tip holder of the fracture start portion forming device of the con rod illustrated in FIG. 4 in an enlarged manner. In this variation, instead of provision of the insert tips 211a and 211b for forming the groove portion and the insert tips 221a and 221b for forming the V-shaped groove two each on the two insert-tip holders 210 and 220, respectively, according to the aforementioned embodiment, one insert-tip holder 260 having constitution as illustrated in FIG. 5 is provided on an insert-tip support unit, not shown here. In this case, as is known from FIG. 5, at a left end close to a lower end portion of the insert-tip holder 260, an insert tip 261 for forming a groove portion having a tip end portion radius of R1 to be opposed to the groove portion is provided, and an insert tip 262 for forming a V-shaped groove having a tip end portion radius of R2 is provided at a position corresponding to that in an opposite side in the diameter direction.

Then, by further providing a mechanism for rotating the insert-tip holder 260 as illustrated by a one-dot chain line arrow in the figure, the groove portion is formed on the left side of the con rod inner peripheral surface by using the first insert tip 261 for forming the groove portion on the left side, first, and by pulling out the insert-tip holder 260 from the con rod 1 and by rotating the insert-tip holder 260 around a holder axis by 180°, the groove portion is formed on the right side of the con rod inner peripheral surface. Then, by using the second insert tip 262 for forming the V-shaped groove having been rotated/moved to the left side of the insert-tip holder 260 in this state, the groove portion on the left side formed in the inner peripheral surface of the con rod 1 is finished into the V-shaped groove as the fracture start portion of the con rod 1, and the insert-tip holder 260 is pulled up from the con rod 1 and rotated around the holder axis by 180° again, and the groove portion on the right side of the con rod inner peripheral surface is finished into the V-shaped groove as the fracture start portion of the con rod by machining with the second insert tip 262 for forming a V-shaped groove.

By forming the fracture start portion of the con rod 1 made of the V-shaped groove 12 by the method described above, a demerit when the fracture start portion of the con rod is formed by using the YAG laser device as before, that is, a high running cost caused by regular replacement of the flash lamp for exciting laser is not incurred. Moreover, the line stop for a long time caused by non-availability of a service and maintenance staff at a failure of the YAG laser device is not incurred, either. As a result, the fracture product can be produced in accordance with a production plan determined in advance.

Moreover, according to the method of forming a fracture start portion of the con rod according to this embodiment, the problem when the fracture start portion of the con rod made only of the V-shaped groove is formed by broaching can be solved. Specifically, nonconformity against the request for energy-saving that, after the groove portion is formed by using the worn broaching blade, power of the con rod fracturing device is required accordingly at the fracture can be avoided.

Moreover, the V-shaped groove 12 of the fracture start portion of the con rod has the small and deep groove opening as described above, unlike a general key groove. That is, when the V-shaped groove is to be formed by using the broaching blade, a specific machining condition that the depth of the V-shaped groove should be large, the V-shape angle should be small, and the bottom portion R of the V-shaped groove should be as small as possible so as to have a deep and sharp angled V-shape is required. Due to the strict machining condition as above mentioned, when the V-shaped groove of the fracture start portion of the con rod is to be formed, chips can easily remain between each blade when the two to three blades constituting the broaching blade are brought into contact with the groove forming portion of the con rod at the same time, and thus, discharging performances of all the chips having remained between each blade need to be considered, which makes an increase of the machining speed difficult and lowers the production efficiency, but in the case of this embodiment, such nonconformity does not occur.

Figure 6:
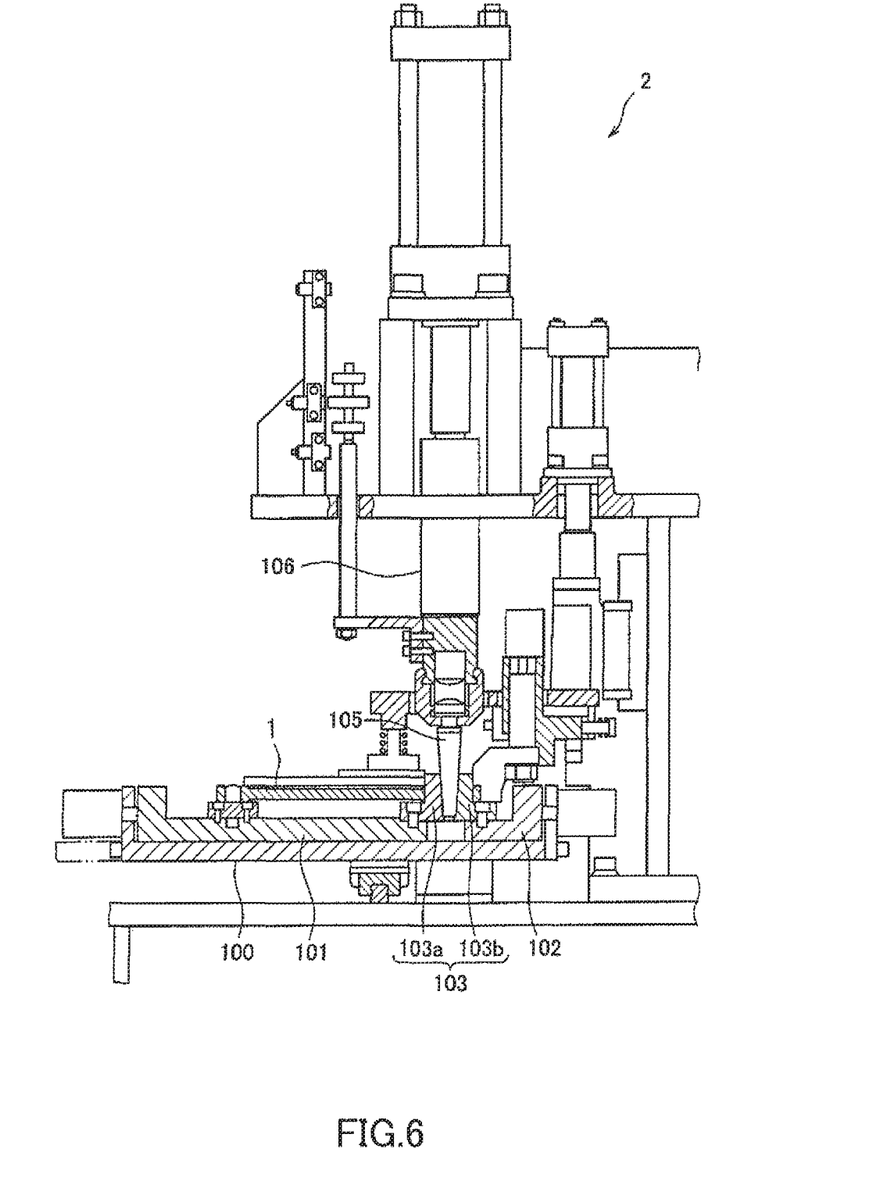
FIG. 6 is a side view illustrating a con rod fracturing device for fracturing a con rod to which the method of forming a fracture start portion of a con rod according to the embodiment of the present invention is applied.

Subsequently, the con rod fracturing device for obtaining a con rod fracture surface which is a uniform fracture surface from the con rod fracture start portion by causing a tensile stress to act on both ends of the con rod will be described below on the basis of the drawings. FIG. 6 is a side view illustrating the con rod fracturing device for fracturing the con rod to which the method of forming a fracture start portion of a con rod according to the embodiment of the present invention is applied.

A con rod fracturing device 2 is, as illustrated in FIG. 6, disposed on a base 100 on which the con rod 1 is placed so as to be movable in a direction separating from each other and includes a first support member 101 and a second support member 102 horizontally supporting a large end 10 and a rod portion of the con rod 1 and a half-split type mandrel 103 composed of two mandrel halves 103a and 103b suspended from these support members 101 and 102 and each having an outer peripheral surface brought into contact and fitted with an inner surface of an opening of the con rod large end.

And there are provided a wedge 105 whose faces to be brought into contact with opposing end faces of each of the mandrel halves 103a, 103b form tapered faces, respectively, so as to uniformly separate and expand each of the mandrel halves 103a, 103b, an actuator 106 for applying a load to the wedge 105, and a control means, not shown, for applying a fracture load to fracture the opening instantaneously after each of the mandrel halves 103a, 103b is brought into contact with the inner face of the con rod opening through the wedge 105 by applying a pressurization load to the actuator 106.

The method of fracturing the con rod using the con rod fracturing device 2 having such structure is carried out as follows. First, the mandrel 103 is urged by a spring in the direction in mutually opposing directions, and the mandrel is contracted to enter the opening of the large end of the con rod. And the wedge 105 is pushed in till the state where the tapered portion at the tip end of the wedge is brought into contact with the mandrels 103a, 103b and is stopped once, and the actuator 106 applies a dynamic load to the wedge 105 through the above control means, by which an expansion force is applied to the above-mentioned fracture start portion of the con rod to be fractured instantaneously. When the aforementioned mandrel 103 is urged in the mutually opposing directions and the mandrel is contracted, an actuator such as a hydraulic cylinder, an air cylinder or the like may be used instead of the spring.

As described above, when the fracture start portion of the con rod is to be formed, according to the machining method using laser, not only the laser device is expensive, but also dealing with at a failure of the device is difficult.

On the other hand, according to the machining method using broaching, in order to utilize the merit of multiple-blade constituting the broaching blade, strict height control of each blade is needed, whereby maintainability is deteriorated. Moreover, the broaching machine itself is also expensive, which deteriorates a cost performance. Moreover, since the two to three blades are in contact with the con rod at the same time during the machining using the broaching blade, chips can easily remain between the blades, and discharge performances of the chips need to be considered, which makes an increase of the machining speed difficult.

Then, in the case of the present invention, by machining with the two types of insert tips with different nose R, that is, having a relation of "R of the cutting blade>R of the groove bottom finishing blade", the problems when the aforementioned laser device is used and the broaching blade is used can be solved at once.

In addition, according to the present invention, it became known that the following actions can be exerted. Specifically, in a machining field of formation of a fracture start portion of a con rod, most of the machining speeds are 10 m/min or less, and the limit is 30 to 40 m/min. Moreover, in a high-speed broaching machining in the other machining fields, the limit is 80 m/min. However, according to the present invention, super high-speed machining of formation of the fracture start portion of the con rod at a machining speed exceeding 80 m/min can be realized in a boring machining field.

Moreover, since different blades are used for each machining purpose, each blade can be maintained easily, and even a worker who is not familiar with the maintenance work does not have to take wasteful maintenance time, whereby production efficiency of the con rod can be improved.

Moreover, the present invention can be also applied not only to con rods formed by forging as described above but also to a con rod made by sintering. Moreover, specific numeral values of the aforementioned groove dimensions are only examples, but it is needless to say that the present invention is not limited to the numeral values as long as the condition of "size of the tip end R of the first insert tip>size of the tip end R of the second insert tip" is satisfied.

REFERENCE SIGNS LIST

| | |
|---|---|
| 1 | con rod |
| 2 | con rod fracturing device |
| 10 | large end |
| 11 | groove portion |
| 12 | V-shaped groove |
| 50 (51, 52, 53) | broaching blade |
| 61, 62, 63 | chip |
| 100 | base |
| 101 | first support member |
| 102 | second support member |
| 103 | mandrel |
| 103a, 103b | mandrel half |
| 105 | wedge |
| 106 | actuator |
| 200 | fracture start portion forming device |
| 210, 220 | insert-tip holder |
| 211a, 211b | first insert tip (cutting tip) |
| 221a, 221b | second insert tip (groove finishing tip) |
| 230 | insert-tip holder support unit |
| 240 | work support portion |
| 250 | work receiving table |
| 260 | insert-tip holder |
| 261 | first insert tip (groove portion forming insert tip) |
| 262 | second insert tip (V-shaped groove forming insert tip) |

The invention claimed is:

1. A method of forming a fracture start portion of a connecting rod for forming fracture start portions of a connecting rod at opposing positions in an inner peripheral surface of a large end of the connecting rod made of metal, comprising:

a first step of forming a groove portion at a position corresponding to the fracture start portion by using a first insert tip having a large tip end portion radius; and a second step of forming a V-shaped groove by machining a bottom portion radius of the groove portion smaller using a second insert tip having a tip end radius smaller than the tip end portion radius of the first insert tip.

2. A fracture start portion forming device of a connecting rod for forming fracture start portions of a metal connecting rod at opposing positions in an inner peripheral surface of a large end of the metal connecting rod made of metal, wherein after a groove portion is formed at a position corresponding to the fracture start portion by using a first insert tip having a large tip end portion radius, the fracture start portion of the connecting rod is formed which has become a V-shaped groove by machining a bottom portion radius of the groove portion smaller by using a second insert tip having a tip end portion radius smaller than the tip end portion radius of the first insert tip.

3. A method of manufacturing a connecting rod, comprising:

a first step of preparing a connecting rod in which a fracture start portion is not formed;

a second step of forming the fracture start portion by applying the method of forming fracture start portions of a connecting rod according to claim 1 at opposing positions in an inner peripheral surface of a large end of the connecting rod; and a third step of fracturing the connecting rod by expanding the inner peripheral surface in which the fracture start portions of the large end of the connecting rod are formed by using a mandrel in a direction perpendicular to an axial direction of the connecting rod.

* * * * *